ized characters.

UNITED STATES PATENT OFFICE.

SHERMAN BROWN, OF PITTSBURG, KANSAS.

COMPOSITION OF MATTER.

No. 885,976.

Specification of Letters Patent.

Patented April 28, 1908.

Application filed April 24, 1907. Serial No. 370,065.

*To all whom it may concern:*

Be it known that I, SHERMAN BROWN, a citizen of the United States, residing at Pittsburg, in the county of Crawford and State of Kansas, have invented a new and useful Composition of Matter, of which the following is a specification.

This invention relates to a composition of matter to be used in the tanning of hides, the object being to produce a preparation by means of which hides of all kinds can be tanned in at least one-half the time now required for that purpose, and at much less expense, and produce a better grade of leather.

To this end the composition consists of the following ingredients in about the proportions given, viz., extract of gambier, five pounds, decoction of blackberry roots, one-eighth of an ounce, decoction of witch hazel, one-eighth ounce, water, six gallons.

The composition is prepared by adding to the gambier only a sufficient quantity of water to dissolve it. Then to each six gallons of soft water, and five pounds of the gambier solution, one-eighth of an ounce of the decoction of witch hazel, and one-eighth of an ounce of the decoction of blackberry roots. These substances are thoroughly mixed and a sufficient quantity of the tanning composition is placed in a vat to act on the hides placed therein, the size, age, thickness, and number of the hides determining the quantity of the composition to be used. Hides are thoroughly tanned in from four hours to eight days, the length of time depending upon their age and thickness.

The decoction of witch hazel is produced by taking, for example, one pound of the bark as it comes from the tree, placing it in two gallons of water and boiling it for two hours in a closed vessel, and then straining. The resultant decoction will measure somewhere between a pint and a quart, the variation being due to the character of the boiling, that is to say, whether it be hard or gentle. The decoction of blackberry roots is produced by taking, for example, one pound of the roots, as they come from the ground, placing them in two gallons of water and boiling them for two hours in a closed vessel and then straining. The resultant decoction will measure somewhere between a pint and a quart, the variation being due to the character of the boiling, that is to say, whether it will be hard or gentle. The decoctions thus obtained are added to a quantity of water containing a solution of from one and a half to five pounds of gambier, the amount of gambier depending upon the quantity of water required to cover the hide, color and set the grain, care being taken to have the two decoctions thoroughly mixed with the gambier solution. The hide will remain submerged in the ooze for a period of from four hours to eight days, the length of time depending on the age and thickness of the hide.

After the hides have been submerged the required length of time in the ooze formed by the ingredients, they are removed and thoroughly washed with water, and then treated with fish oil. These steps effectively remove any tannic acid present.

The above described composition is cheap, and possesses excellent tanning qualities; the witch hazel alone containing ninety-five percent., and the blackberry root decoction, seventy-five percent. The leather produced by this process has great strength, durability and life, it is soft and pliant, and contains no acid, and is made in one-half the time and at one-half the cost of present methods.

The proportions of the ingredients above given are substantially those preferred, but changes may be made in the relative quantities without departing from the spirit of the invention.

I claim:—

1. The herein described composition of matter consisting of gambier, a decoction of witch hazel, and a decoction of blackberry roots and water.

2. The herein described composition of matter consisting of gambier, five pounds, decoction of witch hazel, one-eighth of an ounce, decoction of blackberry roots, one-eighth of an ounce, and soft water, six gallons.

In testimony that I claim the foregoing as my own, I have hereto affixed my signature in the presence of two witnesses.

SHERMAN BROWN.

Witnesses:
J. C. COWEN,
WM. LAUYON, Jr.